United States Patent
Birnbaum et al.

(10) Patent No.: US 10,007,346 B2
(45) Date of Patent: *Jun. 26, 2018

(54) OVERLAYING OF HAPTIC EFFECTS (71) Applicant: Immersion Corporation, San Jose, CA (US)

(72) Inventors: David Birnbaum, Oakland, CA (US); Abraham Alexander Dauhajre, Coral Springs, FL (US); Paige Raynes, Walnut Creek, CA (US); Satvir Singh Bhatia, Milpitas, CA (US)

(73) Assignee: IMMERSION CORPORATION, San Jose, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/410,872

(22) Filed: Jan. 20, 2017

(65) Prior Publication Data
US 2017/0131777 A1 May 11, 2017

Related U.S. Application Data (63) Continuation of application No. 15/052,592, filed on Feb. 24, 2016, now Pat. No. 9,619,034.

(60) Provisional application No. 62/120,718, filed on Feb. 25, 2015.

(51) Int. Cl.
*G06F 3/0488* (2013.01)
*G06F 3/01* (2006.01)

(52) U.S. Cl.
CPC ............ *G06F 3/016* (2013.01); *G06F 3/0488* (2013.01)

(58) Field of Classification Search
CPC .. G06F 3/016; G06F 3/0488; G06F 2203/013; G06F 2203/014; G06F 2203/015
See application file for complete search history.

(56) References Cited

U.S. PATENT DOCUMENTS

| 8,659,571 | B2 | 2/2014 | Birnbaum et al. |
|---|---|---|---|
| 8,982,068 | B2 | 3/2015 | Grant et al. |
| 9,330,544 | B2 | 5/2016 | Levesque et al. |
| 9,619,034 | B2 * | 4/2017 | Birnbaum ............... G06F 3/016 |
| 2007/0005835 | A1 | 1/2007 | Grant et al. |
| 2007/0229455 | A1 | 10/2007 | Martin et al. |
| 2008/0062144 | A1 | 3/2008 | Shahoian et al. |
| 2012/0232780 | A1 | 9/2012 | Delson et al. |
| 2013/0016042 | A1 | 1/2013 | Makinen et al. |

(Continued)

FOREIGN PATENT DOCUMENTS

WO 2012015579 A1 2/2012

OTHER PUBLICATIONS

Any information that are not included with this Information Disclosure Statement can be found in U.S. Appl. No. 15/051,592.

*Primary Examiner* — Ricardo L Osoriao
(74) *Attorney, Agent, or Firm* — Medler Ferro Woodhouse & Mills PLLC (57) ABSTRACT

A system provides overlaid haptic effects. The system determines a primary content and a primary haptic effect associated with the primary content. The system also determines a secondary content and a secondary haptic effect associated with the secondary content. Subsequently, the system outputs the secondary content concurrently with the primary content, and also outputs the secondary haptic effect concurrently with the primary haptic effect on at least one haptic output device.

24 Claims, 3 Drawing Sheets (56) References Cited

U.S. PATENT DOCUMENTS

| | | |
|---|---|---|
| 2014/0073409 A1 | 3/2014 | Lesley et al. |
| 2014/0195906 A1 | 7/2014 | Ramsay et al. |
| 2014/0340209 A1 | 11/2014 | Lacroix et al. |
| 2015/0081110 A1 | 3/2015 | Houston et al. |
| 2016/0026251 A1 | 1/2016 | Da Costa et al. |
| 2016/0144404 A1 | 5/2016 | Houston et al. |
| 2016/0189493 A1 | 6/2016 | Rihn |
| 2016/0216765 A1 | 7/2016 | Levesque et al. |

* cited by examiner

OVERLAYING OF HAPTIC EFFECTS

CROSS REFERENCE TO RELATED APPLICATIONS

This application is a continuation of U.S. patent application Ser. No. 15/052,592, filed on Feb. 24, 2016 and issued as U.S. Pat. No. 9,619,034, the specification of which is hereby incorporated by reference. U.S. patent application Ser. No. 15/052,592 claims priority of U.S. Provisional Patent Application Ser. No. 62/120,718, filed on Feb. 25, 2015, the disclosure of which is hereby incorporated by reference.

FIELD

One embodiment is directed generally to a haptic system, and in particular, to a haptic system that provides overlaid haptic effects.

BACKGROUND INFORMATION

"Haptics" relates to a tactile and force feedback technology that takes advantage of the sense of touch of a user by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

SUMMARY

One embodiment is a system that provides overlaid haptic effects. The system determines a primary content and a primary haptic effect associated with the primary content. The system also determines a secondary content and a secondary haptic effect associated with the secondary content. Subsequently, the system outputs the secondary content concurrently with the primary content, and also outputs the secondary haptic effect concurrently with the primary haptic effect on at least one haptic output device.

DETAILED DESCRIPTION

One embodiment provides haptic effects overlaying functionality by rendering secondary haptic effects in an overlay above a primary haptic content stream. The primary haptic content stream may be associated with and/or synchronized with a primary content such as a video stream, an interactive software interface, etc. The secondary haptic effects may be associated with and/or synchronized with a secondary content such as a banner ad. The primary content may be overlaid with the secondary content such that the secondary content partially occludes the primary content or is provided adjacent to or near the primary content. Some embodiments provide haptic overlaying functionality such that the primary haptic content stream and the secondary haptic effects are provided to a user in a way that is desirable and intuitive with respect to the context of the primary content and the secondary content. Accordingly, embodiments allow for haptic functionality that provides overlaid haptic effects.

Figure 1:
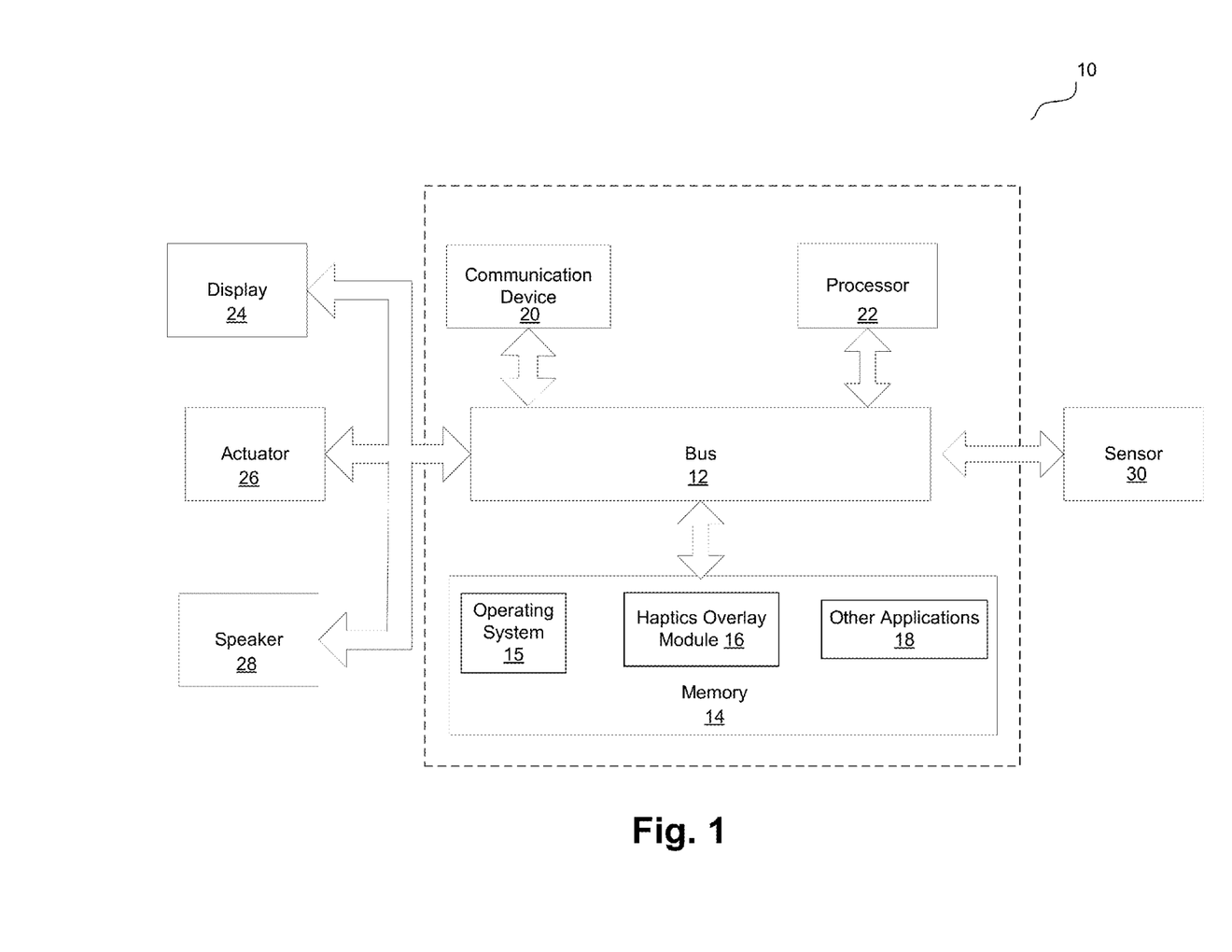
FIG. 1 is a block diagram of a computer server/system in accordance with an embodiment of the present invention.

FIG. 1 illustrates a block diagram of a system 10 in accordance with one embodiment of the invention. In one embodiment, system 10 is part of a mobile device (e.g., a smartphone) or a non-mobile device, and system 10 provides haptics functionality for the device. In another embodiment, system 10 is part of a device that is incorporated into an object in contact with a user in any way (e.g., furniture), and system 10 provides haptics functionality for such device. For example, in one embodiment, system 10 is part of a wearable device, and system 10 provides haptics functionality for the wearable device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides haptics functionality for the device.

Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer-readable instructions, data structures, program modules, or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disks, removable disks, compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic overlay module 16 that provides haptics functionality, as disclosed in more detail herein. In certain embodiments, haptic overlay module 16 may comprise a plurality of modules, where each module provides specific individual functionality for providing haptic effects. System 10 typically includes one or more additional application modules 18 to include additional functionality, such as TouchSense™ software by Immersion Corp.

System 10, in embodiments that transmit and/or receive data from remote sources, further includes a communication device 20, such as a network interface card, to provide mobile wireless network communication, such as infrared, radio, Wi-Fi, cellular network communication, etc. In other embodiments, communication device 20 provides a wired network connection, such as an Ethernet connection, a modem, etc.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a haptic effect to actuator 26, which in turn outputs haptic effects such as vibrotactile haptic effects, electrostatic friction haptic effects, deformation haptic effects, etc. Actuator 26 includes an actuator drive circuit. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, etc. In alternate embodiments, system 10 may include one or more additional actuators, in addition to actuator 26 (not illustrated in FIG. 1). Alternatively or additionally, actuator 26 may operate according to any other haptic technology such as thermal displays (e.g., hot/cold), electrotactile stimulation (i.e., stimulation of tactile receptors with electric current), kinesthetic feedback, etc. Yet another alternative or additional embodiment may implement electrical muscle stimulations such as a task that requires a user to determine what movement or movements the system is making them do and/or making them feel like doing.

Actuator 26 is an example of a haptic output device, where a haptic output device is a device configured to output any form of haptic effects, such as vibrotactile haptic effects, electrostatic friction haptic effects, deformation haptic effects, etc., in response to a drive signal. Accordingly, in alternate embodiments, actuator 26 may be replaced by some other type of haptic output device (not shown) that may be a non-mechanical or a non-vibratory device such as a device that uses electrostatic friction ("ESF") or ultrasonic surface friction ("USF"), a device that induces acoustic radiation pressure with an ultrasonic haptic transducer, a device that uses a haptic substrate and a flexible or deformable surface or shape changing device and that may be attached to a user's body, a device that provides projected haptic output such as a puff of air using an air jet, a laser-based projectile, a sound-based projectile, etc.

For example, one embodiment provides a laser-based projectile where laser energy ionizes air molecules in a concentrated region mid-air to provide plasma (a concentrated mixture of positive and negative particles). In one embodiment, the laser may be a femtosecond laser that emits pulses at very fast and very intense paces, and the faster the laser, the safer for humans to touch. The projectile may appear as a hologram that is haptic and interactive. When the plasma comes in contact with user skin, the user may sense the vibrations of energized air molecules in the concentrated region. Sensations on the user skin are caused by the waves that are generated when the user interacts with plasma in mid-air. Accordingly, haptic effects may be provided to the user by subjecting the user to such concentrated region. Alternatively or additionally, haptic effects may be provided to the user by subjecting the user to the vibrations generated by directed sound energy.

Further, in other alternate embodiments, system 10 may not include actuator 26 or any other haptic output device, and a separate device from system 10 includes an actuator or another haptic output device that generates the haptic effects, and system 10 sends generated haptic signals to that device through communication device 20.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, a digital loudspeaker, etc. In alternate embodiments, system 10 may include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 may be configured to detect a form of energy, or other physical property, such as, but not limited to, sound, movement, acceleration, biological signals, distance, flow, force/pressure/strain/bend, humidity, linear position, orientation/inclination, radio frequency, rotary position, rotary velocity, manipulation of a switch, temperature, vibration, visible light intensity, etc. Sensor 30 may further be configured to convert the detected energy, or other physical property, into an electrical signal, or any signal that represents virtual sensor information. Sensor 30 may be any device, such as, but not limited to, an accelerometer, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gauge, a hygrometer, a linear position touch sensor, a linear potentiometer (or slider), a linear variable differential transformer, a compass, an inclinometer, a magnetic tag (or a radio frequency identification tag), a rotary encoder, a rotary potentiometer, a gyroscope, an on-off switch, a temperature sensor (such as a thermometer, thermocouple, resistance temperature detector, thermistor, temperature-transducing integrated circuit, etc.), a microphone, a photometer, an altimeter, a biological monitor, a camera, a light-dependent resistor, etc., or any device that outputs an electrocardiogram, an electroencephalogram, an electromyograph, an electrooculogram, an electropalatograph, or any other electrophysiological output.

In alternate embodiments, system 10 may include one or more additional sensors, in addition to sensor 30 (not illustrated in FIG. 1). In some of these embodiments, sensor 30 and the one or more additional sensors may be part of a sensor array, or some other type of collection/arrangement of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device may then send the converted signal to system 10 through communication device 20.

Generally, with known systems, a primary media content may be occasionally overlaid with a secondary media content to grab a viewer's attention. This overlaying is common, for example, in an advertising scenario where "superstitial" content is placed in front of a primary content. An example of such superstitial content is a banner advertisement ("ad") including text, animation, and/or video/audio content. Banner ads are often used to advertise services and products. When a user responds to a banner ad, the user is provided with more information relating to the advertised content. A user may respond to a banner ad by, for example, clicking on the ad, pressing a certain button, providing a "gesture," etc. A gesture is a movement of the body to convey a meaning or user intent, for example, as provided in various embodiments in U.S. Pat. No. 8,659,571, the disclosure of which is hereby incorporated by reference. Simple gestures may be combined to form more complex gestures. For example, bringing a finger into contact with a touch sensitive surface may be referred to as a "finger on" gesture, while removing a finger from a touch sensitive surface may be referred to as a separate "finger off" gesture. If the time between the "finger on" and "finger off" gestures is relatively short, the combined gesture may be referred to as "tapping;" if the time between the "finger on" and "finger off" gestures is relatively long, the combined gesture may be referred to as "long tapping;" if the distance between the two dimensional (x,y) positions of the "finger on" and "finger off" gestures is relatively large, the combined gesture may be referred to as "swiping;" if the distance between the two dimensional (x,y) positions of the "finger on" and "finger off" gestures is relatively small, the combined gesture may be referred to as "smearing," "smudging," or "flicking." Any number of two dimensional or three dimensional simple or complex gestures may be combined in any manner to form any number of other gestures, including, but not limited to, multiple finger contacts, palm or first contact, or proximity to the device. A gesture can also be any form of hand movement recognized by a device having an accelerometer, gyroscope, or other motion sensor, and converted to electronic signals. Such electronic signals can activate a dynamic effect, such as shaking virtual dice, where the sensor captures the user intent that generates a dynamic effect.

For example, a user that is receiving a primary content on a touchscreen may receive a banner ad that overlays the primary content on the touchscreen. If the user responds to the ad by tapping at a certain location on the touchscreen, they are provided with further information relating to the advertised content. However, the known systems do not provide overlaying functionality for any haptic content.

In contrast to the known systems, embodiments of the present invention provide haptic effects overlaying functionality. In one embodiment, while a primary haptic content stream is being played back, it is overlaid with a secondary haptic content. One embodiment processes the primary haptic content stream to enable the primary haptic content stream and the secondary haptic content to be concurrently rendered in a way that feels intuitive/desirable to the end user. An alternative or additional embodiment allows for a choice to be made about which one of the primary haptic content stream or the secondary haptic content is to be rendered. This choice may be made, for example, based on user preferences for a desired haptic experience.

In one embodiment, the primary haptic content stream is associated with a primary content such as a textual content, an audio stream, a video stream, an interactive software (e.g., a video game or a mobile application), etc. In one embodiment, the primary haptic content stream includes haptic effects that are synchronized with the primary content. In one embodiment, the secondary haptic content may be associated with a secondary content such as a banner ad or other superstitial video, animation, or graphical element. In one embodiment, the secondary haptic content includes haptic effects that are asynchronous with respect to the primary content. In one embodiment, the secondary haptic content includes haptic effects that are synchronous with the secondary content.

In one embodiment, the secondary content occludes part or all of the primary content or appears adjacent to or near the primary content. In an alternative or additional embodiment, the primary content and the secondary content may be provided on separate devices or on separate displays of the same device.

Generally, if a primary haptic content stream and a secondary haptic content stream are played at the same time, the magnitude of their respective haptic effects is summed which may result in an undesirable and/or uncomfortable sensation for the user. Further, playing two haptic streams at the same time may result in the meaning of the haptic effects (e.g., their synchronization with audio/visual content, the duration and/or pattern of their respective haptic effects, etc.) to become unclear. Accordingly, playing two haptic streams at the same time may result in the messages to be carried by each or both of the haptic content streams (e.g., as intended by the producers of the content) to be lost or to become unclear. However, one embodiment renders a primary haptic content stream and a secondary haptic content stream in such a way that the user is provided with a desirable/comfortable sensation.

In one embodiment, the haptic effects associated with the secondary content are not provided to the user until the user chooses so by responding to the secondary content. For example, when the secondary content is a banner ad asking the user for an input such as tapping on the banner ad, the secondary haptic effects are provided to the user once the user provides a positive response to the banner ad (e.g., taps on the banner ad).

In one embodiment, when it is determined to provide the secondary haptic effects to the user (e.g., when the user taps on a banner ad), the primary haptic effects are "faded out" and the secondary haptic effects are "faded in." In one embodiment, the primary haptic effects are faded out by adjusting one or more haptic parameters of the primary haptic effects such as gain, frequency, amplitude, pulse shape, spacing between successive pulses, etc. For example, the primary haptic effects may be faded out by gradual and/or step-wise reduction of their gain. Alternatively, the primary haptic effects may be abruptly muted or stopped (i.e., an instant reduction to zero gain).

In one embodiment, the secondary haptic effects are faded in by adjusting one or more haptic parameters of the secondary haptic effects such as gain, frequency, amplitude, pulse shape, spacing between successive pulses, etc. For example, the secondary haptic effects may be faded in by gradual and/or step-wise reduction of their gain. Alternatively, the secondary haptic effects may be abruptly started (i.e., an instant increase to maximum gain).

In one embodiment, the secondary haptic effects are faded in or abruptly started when the fading out of the primary haptic effects reaches a threshold value. For example, in one embodiment, the secondary haptic effects are faded in or abruptly started when the gain of the primary haptic effects is reduced to a threshold gain value such as 20% of the maximum gain. In one embodiment, such threshold value is determined/adjusted based on user preferences. In one embodiment, the user preferences may be based on feedback from previous user experiences.

In one embodiment, the threshold value of fading out the primary haptic effects is configured based on human perception. For example, the secondary haptic effects may be faded in or abruptly started when the primary haptic effects are faded out to a level that is near or below a human perception limit. Such human perception limit may be determined according to a model of human perception based on psychophysics. Psychophysics is the scientific discipline that studies the connection between physical stimuli and subjective responses, as provided, for example, in "Measuring, estimating, and understanding the psychometric function: A commentary," Stanley A. Klein, Perception & Psychophysics, 2001, 63 (8), 1421-1455. Psychophysics allows for predicting the subjective response of a user in a perceptual task, as a function of a parameter of a physical stimulus. The subjective response may be, for example, whether one or two consecutive pulses of vibration are perceived by a human. The corresponding parameter of the physical stimuli may be, for example, the gap between the two pulses. Psychophysics generally studies thresholds of perception such as detection thresholds (e.g., the point at which a stimulus becomes perceptible) as well as discrimination thresholds (e.g., the point at which two stimuli can be differentiated). Psychophysical results are often expressed in terms of a psychometric function, with the abscissa being the stimulus strength, and the ordinate measuring an observer response. A psychometric function typically has a sigmoid shape.

In one embodiment, the secondary haptic effects are faded in or abruptly started when the primary haptic effects are being faded out for a period of time (e.g., a few seconds). In one embodiment, as the primary haptic effects are being faded out, the secondary haptic effects begin to fade in or abruptly start based on an editorial content in the secondary content. For example, a designer of haptic effects may include a marker in the secondary content or in the secondary haptic effects to trigger the secondary haptic effects to be faded in or abruptly started.

In one embodiment, as the primary haptic effects are being faded out, the secondary haptic effects begin to fade in or abruptly start based on a contextual element in the secondary content. For example, when the secondary content is a banner ad, the ad may include an explicit haptic effect that is configured to be emphasized/showcased. Accordingly, the secondary haptic effects begin playing with such an explicit haptic effect.

In one embodiment, the primary content may be a video stream provided on a mobile device of a user, and the primary haptic content stream may be a haptic track designed for the video stream and played back in synchronization with the playback of the video stream. At some point during the playback, the user is provided with a secondary content such as a banner or superstitial video, animation, or graphical element that occludes part or all of the primary content, or appears adjacent to or near the primary content. In one embodiment, when the secondary content appears, a graphical animation and associated haptic effects play to draw the user's attention away from the primary content and toward the secondary content.

In one embodiment, the secondary content is included in a discrete package that is independent from the primary content. In this embodiment, the secondary haptic effects are packaged together with other content that form the secondary content. For example, when the secondary content is a banner ad, the haptic effects associated with the secondary content are packaged together with other content that form the banner ad such as video/audio content, animation, graphical elements, etc. Accordingly, the primary content and the secondary content are provided by different and independent sources, and so are their associated haptic effects.

For example, in one embodiment, the primary content and the haptic effects associated with the primary content are provided by a first multimedia source, while the secondary content and the haptic effects associated with the secondary content are included in a package provided by a second multimedia source that is independent from, and different than, the first multimedia source. In one embodiment, the primary content and the haptic effects associated with the primary content are encoded in a first multimedia track, while the secondary content and the haptic effects associated with the secondary content are encoded in a second multimedia track independent from, and different than, the first multimedia track. In one embodiment, the primary content and the haptic effects associated with the primary content are encoded in a multimedia track, while the secondary content and the haptic effects associated with the secondary content are included in a package independent from the multimedia track, and such package is retrieved based on markers/tags in the multimedia track.

In one embodiment, a user may be using a device to interact with an interactive software (e.g., a game, app, or other interactive feature), and such interaction may be generating a stream of haptic effects (e.g., a haptic track associated with a background music) and/or a series of individual haptic effects (e.g., haptic effects associated with events caused by the user's interaction with the game or app such as scoring). At some point during this interaction, the user is provided with a secondary content such as a banner or superstitial graphical element that occludes part or all of the interactive content or appears adjacent to or near the interactive content. When the secondary content appears, a graphical animation and associated haptic effects play to draw the user's attention away from the primary content and toward the secondary content. In one embodiment, the banner may show a bouncing ball, and as the ball bounces in the banner, the embodiment plays haptic effects configured to feel like a bouncing ball.

In one embodiment, the secondary content is a superstitial video that is played along with a haptic effect stream synchronized with the superstitial video. In one embodiment, the superstitial video may be a movie trailer including explosion elements/events, and when the explosions occur, the embodiment plays haptic effects configured to feel like explosions.

Figure 2:
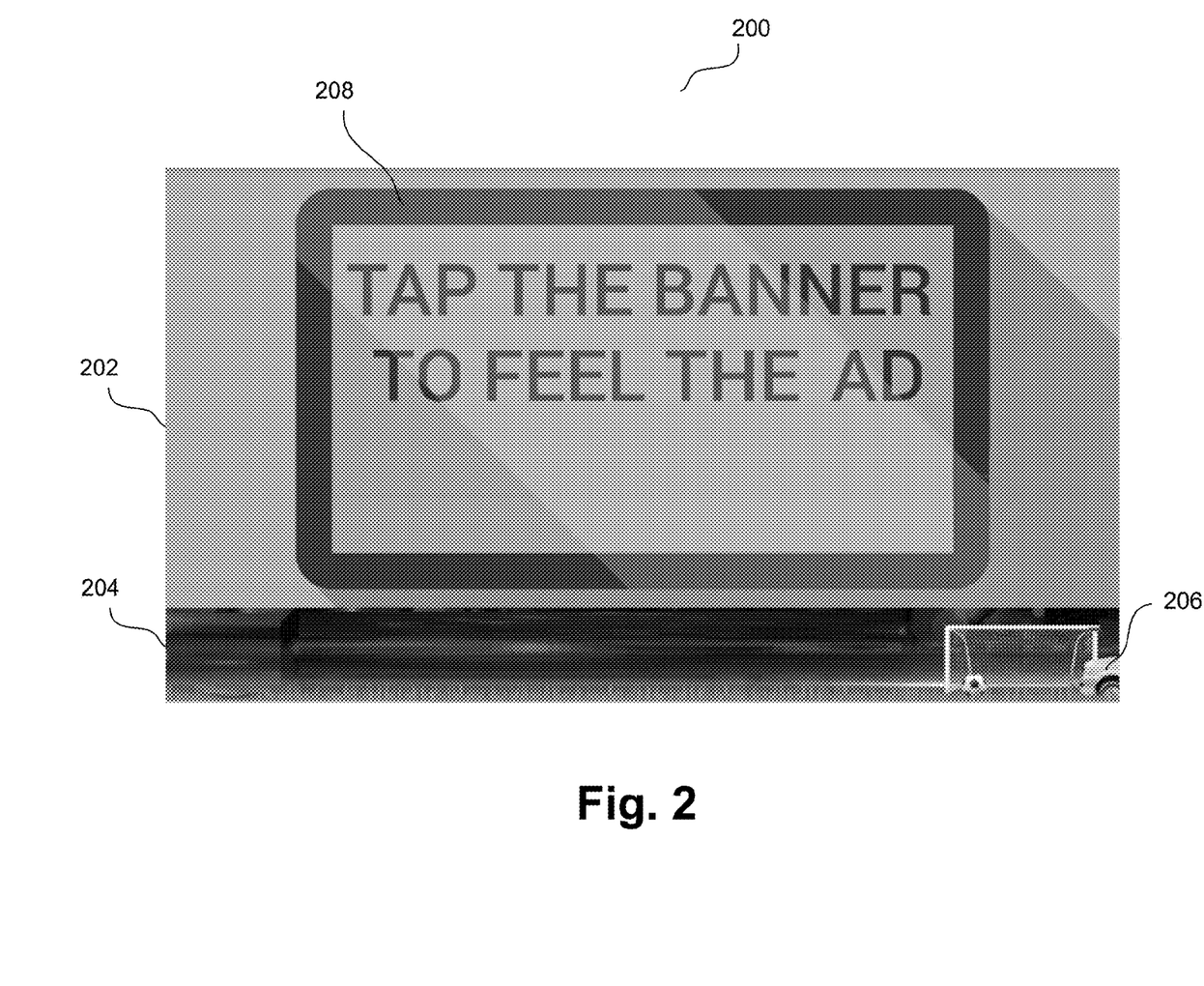
FIG. 2 illustrates an example user interface for providing haptic overlay functionality according to an embodiment of the present invention.

FIG. 2 illustrates an example user interface ("UI") 200 for providing haptic overlay functionality according to an embodiment of the present invention. UI 200 provides a primary content 202 on the display of a device such as a mobile device held by a user. In one embodiment, primary content 202 may be a video of a soccer game which is played back on the mobile device along with a primary haptic track. At some point during the playback of primary content 202, a secondary content 204 is provided in UI 200. In the embodiment of FIG. 2, secondary content 204 is provided at the bottom of primary content 202 and partially occludes primary content 202. However, in alternative embodiments, secondary content 204 may occlude other parts or all of primary content 202 or appear adjacent to or near primary content 202. In yet another alternative embodiment, primary content 202 and secondary content 204 may be provided on different devices or on different displays/UIs of a same user device.

Secondary content 204 may include superstitial content. In FIG. 2, the superstitial content is a banner ad showing a car 206 "driving onto" UI 200. In one embodiment, when car 206 moves, a haptic effect configured to feel like a rumbling engine is played on the mobile device. In one embodiment, a marker/tag in the playback of primary content 202 or a marker/tag in the haptic effects associated with primary content 202 may initiate or trigger the playing of secondary content 204.

One embodiment ensures that the primary haptic content stream that accompanies primary content 202 and the secondary haptic content that accompanies secondary content 204 are combined in a way that creates a desired experience for the user of the mobile device. For example, primary content 202 may be an action movie including a gunfight scene, and secondary content 204 may be provided during the gunfight scene. In order to render haptic effects for both primary content 202 and secondary content 204, the haptic effects associated with the gunfight scene may be attenuated (but still played) while car 206 drives "onscreen" and produces a haptic effect that feels like an engine rumbling. Accordingly, the user can still feel the haptic effects associated with the gunfight scene, thus ensuring a good experience of primary content 202 and ensuring that the creative intent of primary content 202 is preserved as much as possible, while also enabling a secondary haptic content stream to be experienced as distinct from, and yet seamlessly mixed with, the primary haptic content stream.

An alternative embodiment mutes the haptic track of primary content 202 and allows for the haptic content of secondary content 204 to be played upon launch of secondary content 204.

In one embodiment, the haptic effects associated with secondary content 204 are not played unless enabled/allowed by the user of the mobile device. For example, in the embodiment of FIG. 2, when secondary content 204 is provided in UI 200, a user interaction box 208 is also provided in UI 200 to ask the user whether they desire to enable the haptic effects of secondary content 204. For example, when secondary content 204 is a banner ad, user interaction box 208 may ask the user to tap the banner to "feel" the ad. Accordingly, the haptic effects associated with secondary content 204 begin playing if/when the user taps the banner.

In one embodiment, it takes secondary content 204 a time period "$T_{banner\text{-}anim}$" to animate into UI 200. For example, in the embodiment of FIG. 2, it may take secondary content 204 a few seconds to slide into the bottom portion of UI 200. In this embodiment, the haptic effects associated with primary content 202 may be attenuated (e.g., partially faded out) during time period $T_{banner\text{-}anim}$. In one embodiment, the haptic effects associated with primary content 202 are de-emphasized by adjusting one or more of their haptic parameters such as gain, frequency, amplitude, pulse shape, spacing between successive pulses, etc. For example, the haptic effects associated with primary content 202 may be de-emphasized by gradual and/or step-wise reduction of their gain during time period $T_{banner\text{-}anim}$ such that their gain at the end of time period $T_{banner\text{-}anim}$ is a percentage (e.g., 20%) of their maximum gain. Such percentage may be selected by a user or configured by a designer of the haptic effects. Alternatively, the haptic effects associated with primary content 202 may be abruptly muted or stopped during or at the end of time period $T_{banner\text{-}anim}$ (i.e., an instant reduction to zero gain).

In one embodiment, the haptic effects associated with secondary content 204 are faded in during a time period "$T_{banner\text{-}haptic\text{-}start}$" that follows the time period $T_{banner\text{-}anim}$. In one embodiment, the haptic effects associated with secondary content 204 are faded in by adjusting one or more of their haptic parameters such as gain, frequency, amplitude, pulse shape, spacing between successive pulses, etc. For example, the haptic effects associated with secondary content 204 may be faded in by gradually and/or step-wise increasing of their gain during time period $T_{banner\text{-}haptic\text{-}start}$ such that their gain at the end of time period $T_{banner\text{-}haptic\text{-}start}$ is a percentage (e.g., 80%) of their maximum gain. Such percentage may be selected by a user or configured by a designer of the haptic effects. Alternatively, the haptic effects associated with secondary content 204 may be abruptly started at a point during, or at the end of, time period $T_{banner\text{-}haptic\text{-}start}$ (i.e., an instant increase to maximum gain).

In one embodiment, once the playing of the haptic effects associated with secondary content 204 is completed, the haptic effects associated with primary content 202 are faded back in. For example, once the playing of the haptic effects associated with secondary content 204 is completed, the haptic effects associated with primary content 202 may be faded back in by increasing their gain to the initial values before time period $T_{banner\text{-}anim}$. Alternatively, the haptic effects associated with primary content 202 may be abruptly re-started (i.e., an instant increase to maximum gain).

One embodiment assigns relative priorities to the haptic effects associated with primary content 202 and the haptic effects associated with secondary content 204. Such prioritizing may be based on, for example, a revenue associated with primary content 202 and a revenue associated with secondary content 204. Alternatively or additionally, the prioritizing may be based on user preferences. In one embodiment, upon determining relative priorities of the haptic effects associated with primary content 202 and the haptic effects associated with secondary content 204, the haptic effects with a higher priority are played while the haptic effects with a lower priority are muted/ignored. For example, a public safety message that is played as a primary content may be assigned a high priority such that no haptic effects associated with any secondary content are allowed to interrupt the playing of the haptic effects associated with the public safety message. As another example, a public safety message that is played as a secondary content may be assigned a high priority such that no haptic effects associated with any primary content are allowed to stop the playing of the haptic effects associated with the public safety message. In yet another example, a certain banner ad may be assigned a high priority based on its revenue, hence haptic effects associated with any primary content are by default overlaid with haptic effects associated with such banner ad.

In one embodiment, the haptic effects associated with primary content 202 are provided on a first haptic output device/actuator and the haptic effects associated with secondary content 204 are provided on a second haptic output device/actuator that is different than the first haptic output device/actuator. In this embodiment, fading out the haptic effects associated with primary content 202 and fading in the haptic effects associated with secondary content 204 may be felt by the user as a transfer of haptic feedback from the first haptic output device/actuator to the second haptic output device/actuator.

In one embodiment, as the haptic effects associated with primary content 202 are de-emphasized and the haptic effects associated with secondary content 204 are faded in or emphasized, the haptic effects associated with primary content 202 are played as "background" haptic effects and the haptic effects associated with secondary content 204 are played as "foreground" haptic effects. For example, in an embodiment where foreground haptic effects are played on a first haptic output device/actuator and background haptic effects are played on a second haptic output device/actuator, de-emphasizing the haptic effects associated with primary content 202 moves these haptic effects from the first haptic output device/actuator to the second haptic output device/actuator, and emphasizing or fading in the haptic effects associated with secondary content 204 moves these haptic effects from the second haptic output device/actuator to the first haptic output device/actuator.

In an alternative or additional embodiment, such foreground and background haptic effects may be provided at substantially the same time (e.g., concurrently). That is, the haptic effects associated with primary content 202 may be played at the second haptic output device/actuator while the haptic effects associated with secondary content 204 are played at the first haptic output device/actuator. In some embodiments, providing foreground and background haptic effects on different haptic output devices/actuators may be performed according to the embodiments described in U.S. Pat. No. 8,982,068, the disclosure of which is hereby incorporated by reference.

Figure 3:
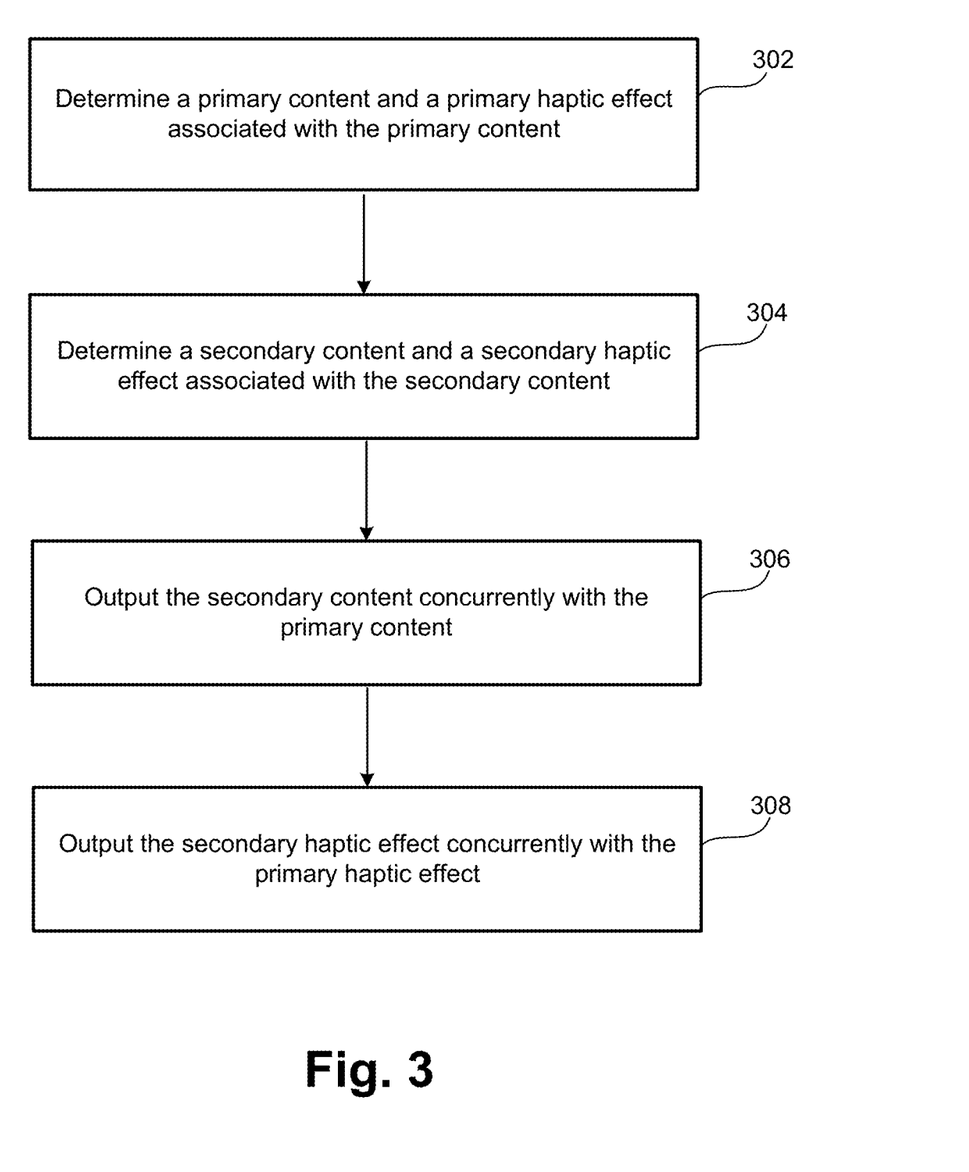
FIG. 3 is a flow diagram of the operation of the haptic overlay module of FIG. 1 when performing haptic overlay functionality in accordance with embodiments of the present invention.

FIG. 3 is a flow diagram of haptics overlay module 16 of FIG. 1 when producing haptic effects in accordance with embodiments of the present invention. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302 a primary content and a primary haptic effect associated with the primary content are determined. In one embodiment, the primary content is a media content or an interactive content. In one embodiment, the primary haptic effect is included in a haptic track that is synchronized with the primary content.

At 304 a secondary content and a secondary haptic effect associated with the secondary content are determined. In one embodiment, the primary content and the primary haptic effect associated with the primary content are output prior to the determining of the secondary content and the secondary haptic effect associated with the secondary content. In one embodiment, the secondary content is a banner ad.

At 306 the secondary content is output concurrently with the primary content. In one embodiment, when the secondary content is output concurrently with the primary content, the secondary content occludes at least a portion of the primary content or is adjacent to or near the primary content on the UI. In one embodiment, concurrently outputting the primary content and the secondary content is performed by simultaneously playing the primary content and the secondary content (e.g., at virtually the same time and/or with the same start and/or end times).

At 308 the secondary haptic effect is output concurrently with the primary haptic effect on at least one haptic output device. In one embodiment, concurrently outputting the primary haptic effect and the secondary haptic effect is performed by simultaneously playing the primary haptic effect and the secondary haptic effect (e.g., at virtually the same time and/or with the same start and/or end times). In one embodiment, the primary haptic effect is asynchronous with respect to the secondary haptic effect. In one embodiment, the primary haptic effect may be synchronous or asynchronous with respect to the primary content. In one embodiment, the secondary haptic effect may be synchronous or asynchronous with respect to the secondary content.

In one embodiment, the secondary haptic effect is output concurrently with the primary haptic effect by fading out the primary haptic effect and fading in the secondary haptic effect. In one embodiment, the fading out of the primary haptic effect is performed by adjusting a haptic parameter of the primary haptic effect. In one embodiment, the haptic parameter is a gain of the primary haptic effect. In one embodiment, the fading in of the secondary haptic effect is performed by adjusting a haptic parameter of the secondary haptic effect. In one embodiment, the haptic parameter is a gain of the secondary haptic effect. In one embodiment, after the secondary haptic effect is finished playing, the primary haptic effect is faded back in. In one embodiment, the secondary haptic effect is output concurrently with the primary haptic effect by muting the primary haptic effect and playing the secondary haptic effect.

As disclosed, embodiments allow for one set of haptic effects to be overlaid with another set of haptic effects. One embodiment renders asynchronous haptic effects over a synchronous haptic content stream so that an ongoing haptic experience is interrupted or layered under an additional haptic experience. One embodiment allows for a primary haptic track to be faded out and a secondary haptic track to be faded in. Accordingly, embodiments provide for a haptic track to be properly overlaid with another haptic track such that the two haptic tracks are distinguishable from each other and do not cancel one another.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of providing haptic effects, comprising:
   determining a primary content and a primary haptic effect associated with the primary content, wherein the primary content is from a first multimedia source;
   outputting the primary content;
   outputting the primary haptic effect on a haptic output device concurrently with a first portion of the primary content;
   determining a secondary content and a secondary haptic effect associated with the secondary content, wherein the secondary content is from a secondary multimedia source different than the first multimedia source;
   outputting the secondary content concurrently with a second portion of the primary content;
   determining which one of the primary haptic effect or the secondary haptic effect is to be rendered along with the outputting of the secondary content concurrently with the second portion of the primary content; and
   while the secondary content is being concurrently outputted with the second portion of the primary content, outputting either the primary haptic effect or the secondary haptic effect based on the determining of which one of the primary haptic effect or the secondary haptic effect is to be rendered.

2. The method of claim 1, wherein the determining of which one of the primary haptic effect or the secondary haptic effect is to be rendered is based on a user preference for a desired haptic experience.

3. The method of claim 1, wherein the determining of which one of the primary haptic effect or the secondary haptic effect is to be rendered is based on whether a user input in response to the secondary content is received.

4. The method of claim 3, wherein the determining of which one of the primary haptic effect or the secondary haptic effect is to be rendered comprises determining that the secondary haptic effect associated with the secondary content is to be rendered when a user response to the secondary content has been received.

5. The method of claim 4, wherein the secondary content comprises a banner ad asking for the user response to the banner ad, wherein the secondary haptic effect is provided once the user response to the banner ad is received.

6. The method of claim 5, wherein the banner ad asks for a tap on the banner ad, wherein the secondary haptic effect is provided once the tap on the banner ad is received.

7. The method of claim 1, wherein the determining of which one of the primary haptic effect or the secondary haptic effect is to be rendered is based on an editorial content in the secondary content.

8. The method of claim 7, wherein the editorial content comprises a marker included in the secondary content by a designer of the secondary haptic effect to trigger the outputting of the secondary haptic effect.

9. The method of claim 1, wherein the first multimedia source is a first multimedia track, and the second multimedia source is a second multimedia track.

10. The method of claim 1, wherein the first multimedia source is a first video stream, and the second multimedia source is a second video stream or is an animation.

11. The method of claim 1, wherein the first multimedia source is a software application, and the second multimedia source is a video stream or is an animation.

12. The method of claim 1, wherein the primary content and the secondary content both include visual content and are displayed on a user interface, and wherein the secondary content occludes at least part of the primary content on the user interface.

13. The method of claim 12, further comprising, when the secondary content is displayed on the user interface, displaying on the user interface a request for user input on whether to enable the secondary haptic effect associated with the secondary content, wherein the secondary haptic effect is outputted in response to user input to enable the secondary haptic effect.

14. A method of providing haptic effects, comprising:
   determining a primary content and a primary haptic effect associated with the primary content;
   outputting the primary haptic effect on a first haptic output device concurrently with a first portion of the primary content, wherein the primary content is outputted on a user interface;
   determining a secondary content and a secondary haptic effect associated with the secondary content;
   outputting the secondary content concurrently with a second portion of the primary content on the user interface;
   displaying on the user interface a request for user input on whether to enable the secondary haptic effect associated with the secondary content, and
   in response to receiving user input to enable the secondary haptic effect, outputting the secondary haptic effect on the first haptic output device, wherein the outputting of the secondary haptic effect on the first haptic output device is performed while the secondary content is being concurrently outputted with the second portion of the primary content.

15. The method of claim 14, wherein the primary haptic effect is muted during the outputting of the secondary haptic effect on the first haptic output device.

16. A method of providing overlaid haptic effects, comprising:
   determining a primary content and a primary haptic effect associated with the primary content;
   determining a secondary content and a secondary haptic effect associated with the secondary content;
   outputting the secondary content concurrently with the primary content; and
   outputting the secondary haptic effect concurrently with the primary haptic effect on at least one haptic output device, wherein the outputting of the secondary haptic effect concurrently with the primary haptic effect includes fading out the primary haptic effect.

17. The method of claim 16, wherein the primary content and the primary haptic effect associated with the primary content are output prior to the determining of the secondary content and the secondary haptic effect associated with the secondary content.

18. The method of claim 16, wherein the primary haptic effect is included in a haptic track that is synchronized with the primary content.

19. The method of claim 16, wherein, when the secondary content is output concurrently with the primary content, the secondary content occludes at least a portion of the primary content or is adjacent to or near the primary content on the user interface.

20. The method of claim 16, wherein the fading out of the primary haptic effect is performed by adjusting a haptic parameter of the primary haptic effect.

21. The method of claim 20, wherein the haptic parameter is a gain of the primary haptic effect.

22. The method of claim 16, wherein the outputting of the secondary haptic effect concurrently with the primary haptic effect further includes fading in the secondary haptic effect.

23. The method of claim 22, wherein the fading in of the secondary haptic effect is performed by adjusting a haptic parameter of the secondary haptic effect.

24. The method of claim 23, wherein the haptic parameter is a gain of the secondary haptic effect.

* * * * *

UNITED STATES PATENT AND TRADEMARK OFFICE
CERTIFICATE OF CORRECTION

PATENT NO. : 10,007,346 B2  
APPLICATION NO. : 15/410872  
DATED : June 26, 2018  
INVENTOR(S) : David Birnbaum et al.

Page 1 of 1

It is certified that error appears in the above-identified patent and that said Letters Patent is hereby corrected as shown below:

On the Title Page

Item (*), Notice, Line 3, "0 days. days." should be replaced with --0 days.--.

In the Claims

Column 14, Lines 45-46 (Claim 19): "on the user interface" should be replaced with --on a user interface--.

Signed and Sealed this  
Twenty-first Day of August, 2018

Andrei Iancu  
*Director of the United States Patent and Trademark Office*